United States Patent
Chen et al.

(10) Patent No.: US 9,264,784 B2
(45) Date of Patent: Feb. 16, 2016

(54) SOCIAL NETWORK-BASED AUTOMATED PROGRAM CHANNEL RECOMMENDER

(71) Applicant: Verizon Patent and Licensing, Inc., Basking Ridge, NJ (US)

(72) Inventors: Ming Chen, Bedford, MA (US); Yong Liu, Brooklyn, NY (US); Guibin Tian, Brooklyn, NY (US); Dahai Ren, Lincoln, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 172 days.

(21) Appl. No.: 13/795,496

(22) Filed: Mar. 12, 2013

(65) Prior Publication Data
US 2014/0280116 A1 Sep. 18, 2014

(51) Int. Cl.
| | |
|---|---|
| *G06F 17/30* | (2006.01) |
| *H04N 21/658* | (2011.01) |
| *H04N 21/25* | (2011.01) |
| *H04N 21/258* | (2011.01) |
| *H04N 21/262* | (2011.01) |
| *H04N 21/442* | (2011.01) |
| *G06Q 10/10* | (2012.01) |
| *G06Q 50/00* | (2012.01) |

(52) U.S. Cl.
CPC .......... *H04N 21/6582* (2013.01); *G06Q 10/10* (2013.01); *H04N 21/252* (2013.01); *H04N 21/25866* (2013.01); *H04N 21/25891* (2013.01); *H04N 21/26258* (2013.01); *H04N 21/44222* (2013.01); *G06Q 50/01* (2013.01)

(58) Field of Classification Search
CPC ..................... G06F 17/30867; H04N 21/4668; H04N 21/4826
See application file for complete search history.

(56) References Cited

U.S. PATENT DOCUMENTS

| | | | |
|---|---|---|---|
| 8,644,688 B2* | 2/2014 | Fishman et al. | 386/299 |
| 2009/0271820 A1* | 10/2009 | Choi et al. | 725/37 |
| 2011/0067079 A1* | 3/2011 | White et al. | 725/110 |
| 2011/0078716 A1* | 3/2011 | MacWan | 725/14 |
| 2011/0088051 A1* | 4/2011 | Zhu et al. | 725/14 |
| 2011/0162022 A1* | 6/2011 | Xia | 725/109 |
| 2011/0214154 A1* | 9/2011 | Nagano | 725/87 |
| 2012/0210353 A1* | 8/2012 | Wong et al. | 725/37 |
| 2012/0317135 A1* | 12/2012 | Jin et al. | 707/769 |
| 2013/0031210 A1* | 1/2013 | Redmond | 709/218 |
| 2013/0263168 A1* | 10/2013 | Choi | 725/14 |

FOREIGN PATENT DOCUMENTS

EP 2357804 A1 * 8/2011

* cited by examiner

*Primary Examiner* — Mohammad S Rostami (57) ABSTRACT

Method, device, and non-transitory storage medium to obtain program historical data and social network data associated with users that receive one or more programs via one or more channels; calculate a social similarity value; calculate a channel-interest similarity value; calculate a similarity index value based on the social similarity value and the channel-interest similarity value; calculate a program weight value for each program; calculate a stay-time, for each channel, that indicates a time period each of the users remained on each channel; calculate based on each program weight value, each stay-time, and each similarity index value, a channel weight for each channel; and select based on each channel weight, one or more channels to recommend to at least one of the users.

20 Claims, 8 Drawing Sheets

| CHANNEL NAME 505 | TIMESTAMP 510 | STAY-TIME 515 |
|---|---|---|
| 242 – 1AFF32, … | 02/21/2013 8:30 AM | 1 HOUR 32 MINUTES 5 SECONDS |
| 505 – 234BB, … | 02/21/2013 7:30 PM | 3 HOURS |
| … | … | … |
| 899 – 1F323 | 02/21/2013 10:30 PM | 30 MINUTES |

Fig. 7B

SOCIAL NETWORK-BASED AUTOMATED PROGRAM CHANNEL RECOMMENDER

BACKGROUND

Program service providers, such as television service providers, deliver programs to users using different types of channels (e.g., Internet Protocol Television (IPTV) channels, Quadrature Amplitude Modulation (QAM) channels, etc.). Other program service providers, such as on-line program providers, deliver programs to users via the Internet. Users are provided with a myriad of different types of programs to view, record, purchase (e.g., buy, rent, etc.), or digest for free.

A recommendation engine is used in various venues, such as on a YouTube® site and a Netflix® site, to assist users in selecting programs. However, under this framework, the recommendation engine recommends stand-alone programs. This is in contrast to a program channel-based framework that may include irregularly scheduled programs, has limited or no future program information, or a combination thereof.

DETAILED DESCRIPTION OF PREFERRED EMBODIMENTS

The following detailed description refers to the accompanying drawings. The same reference numbers in different drawings may identify the same or similar elements.

The term "program," as used herein, is intended to include video data, audio data, or a combination of audio data and video data. A program may include television content or Internet content. Television content may include a live-program (e.g., a live broadcast, etc.) or a pre-recorded program. By way of further example, a program may be a movie, a news program, a television show, video-on-demand (VoD) content, premium channel content, or pay-per-view (PPV) content. Internet content may include a podcast, a program available on a web site (e.g., an on-line channel), etc. A program may be in various formats, such as, for example, standard definition, high-definition, 3-D, etc.

The term "channel," as used herein, is intended to include a television channel or an Internet channel. For example, the channel may be a digital channel (e.g., over-the-air, cable, etc.), an on-line channel, or an IPTV channel.

According to an exemplary embodiment, a recommendation engine recommends a channel to a user based on the user's program history and the program history of other users that have a social network connection to the user. According to an exemplary embodiment, a social similarity value between the user and other users is calculated. According to an exemplary embodiment, a user's interest in a program, which is common to another user, is calculated based on a similarity algorithm (e.g., Pearson correlation similarity algorithm, Cosine-similarity algorithm, etc.). According to an exemplary embodiment, a similarity index value between the users is calculated based on the social similarity value and the channel-interest similarity value.

According to an exemplary embodiment, the recommendation engine calculates the regularity (e.g., daily, weekly, monthly, etc.), if present, of a program provided on a channel based on the program historical data, as described further below. For example, the recommendation engine calculates the regularity of a program even when the program historical data does not include regularity data to indicate the regularity of a program. Additionally, for example, the recommendation engine calculates the regularity of a program even when the program historical data does not include program identifiers that uniquely identify the programs. According to an exemplary embodiment, the recommendation engine recommends a channel to the user based on the calculated regularity of programs digested by the user. For example, when a program is provided less often relative to another program, the program is assigned a higher program weight than the other program.

According to an exemplary embodiment, the recommendation engine calculates a weighted value for each channel. According to an exemplary implementation, the weight is calculated based on a stay-time associated with the channel, the similarity index value, and a program regularity value. The recommendation engine selects the top N channels and provides them to the user. Given the dynamic nature of programs available on a channel, according to an exemplary embodiment, the recommendation engine recommends channels in real-time or near real-time.

While exemplary embodiments provided in this description may be implemented based on the use of a particular network architecture, platform, etc., such implementations are not intended to be restrictive or provide an exhaustive treatment, as such. In other words, the embodiments described herein may be implemented using other suitable network architectures, platforms, etc., which may not be specifically described.

Figure 1:
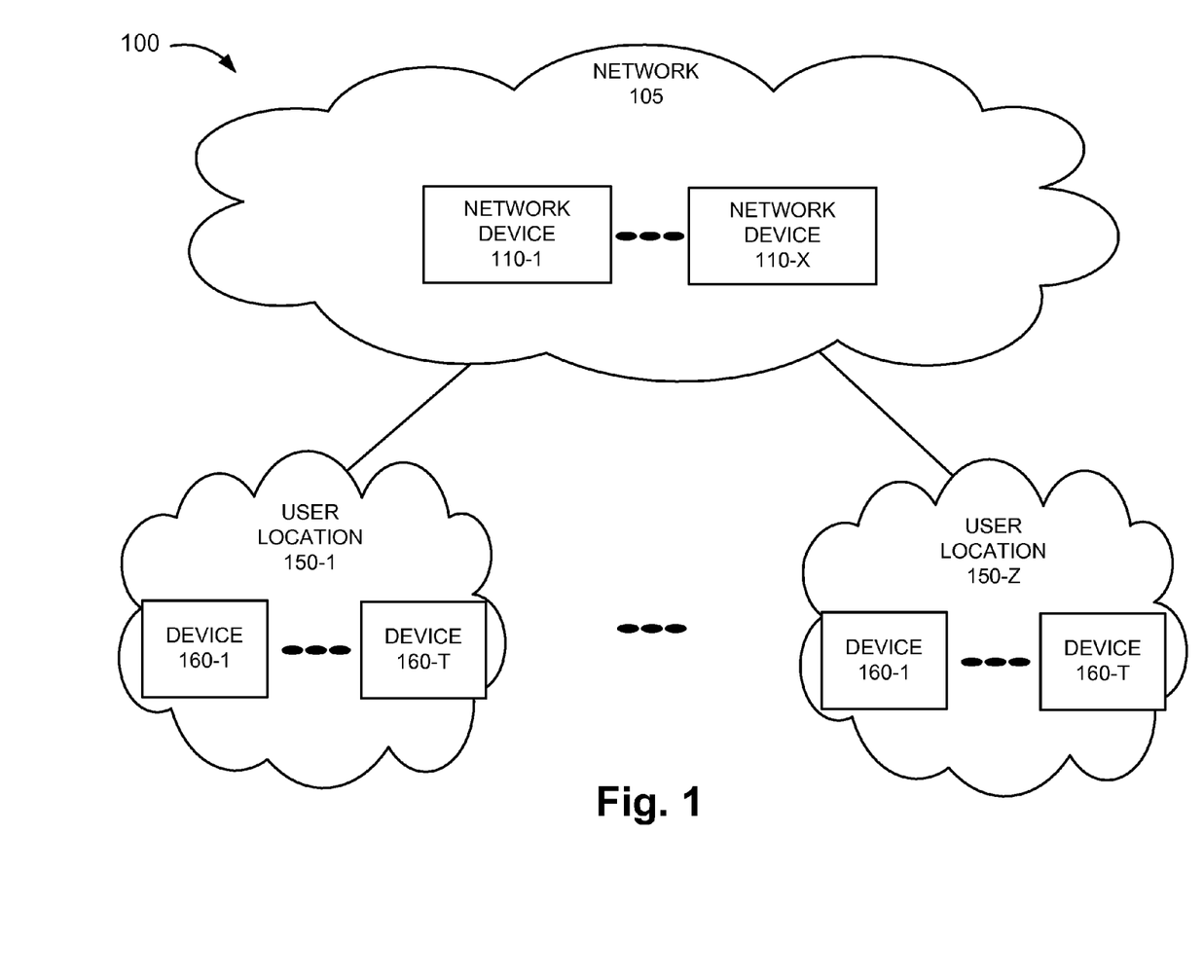
FIG. 1 is a diagram illustrating an exemplary environment in which exemplary embodiments may be implemented.

FIG. 1 is a diagram illustrating an exemplary environment 100 in which exemplary embodiments may be implemented. As illustrated, environment 100 includes a network 105. Network 105 includes network devices 110-1 through 110-X, in which X>1 (also referred to collectively as network devices 110 or individually as network device 110). Environment 100 also includes user locations 150-1 through 150-Z, in which Z>1 (also referred to collectively as user locations 150 or individually as user location 150). Each user location 150 includes devices 160-1 through 160-T, in which T>1 (also referred to collectively as devices 160 or individually as device 160).

Environment 100 may be implemented to include wired, optical, and/or wireless connections among the devices and network illustrated. A connection may be direct or indirect and may involve intermediary device(s) and/or network(s) not illustrated in FIG. 1. Additionally, the number and the arrangement of connections between the devices and the network are exemplary.

The number of devices and networks, and the configuration in environment 100 are exemplary. According to other embodiments, environment 100 may include additional devices, fewer devices, different devices, and/or differently arranged devices, than those illustrated in FIG. 1. For example, user location 150 may include a single device 160.

Additionally, or alternatively, environment 100 may include an additional network and/or a differently arranged network, than that illustrated in FIG. 1.

A device may be implemented according to a centralized computing architecture, a distributed computing architecture, or a cloud computing architecture. Additionally, a device may be implemented according to one or multiple network architectures (e.g., a client device, a server device, a peer device, a proxy device, or a combination thereof).

Network 105 includes a network that provides programs to users. For example, network 105 includes a program repository that stores programs and a program delivery network. Network 105 may be implemented as a satellite-based network, a terrestrial-based network, or a combination thereof. According to an exemplary implementation, network 105 provides programs to users that subscribe to a television service. Additionally, or alternatively, network 105 may provide programs to users that subscribe to other types of services, such as a mobile service or an Internet service. Network 105 may be implemented as a television distribution network, a mobile network, a program streaming network, or other suitable network (e.g., the Internet, a vehicular communication network, etc.) for providing programs to users.

Network devices 110 include network devices that are capable of performing processes, as described herein. For example, a portion of network devices 110 is capable of delivering programs to users via devices 160 of user locations 150. For example, this portion of network devices 110 may be implemented to deliver programs using various technologies, such as an optical architecture, a coaxial cable architecture, an Internet Protocol (IP) TV architecture, a digital subscriber line (DSL) architecture, a wireless architecture, an Internet-based architecture, or some combination thereof. Depending on the architecture implemented, this portion of network devices 110 may include various types of program distribution devices, program storage devices, and other types of devices that contribute to a program service, such as, billing devices, security devices, customer profile devices, and application server devices. By way of further example, this portion of network devices 110 may include super headend (SHE) devices, video hub office (VHO) devices, video serving office (VSO) devices, routers, gateway devices, program server devices, interactive programming guide devices, load balancer devices, optical network termination (ONT) devices, switching devices, splitter devices, passive optical network (PON) devices, web servers, etc.

A portion of network devices 110 is capable of acquiring program historical data. For example, the program historical data includes data that indicates channels (e.g., channel identifiers) used by users via devices 160. As described herein, the program historical data may include other data. For example, the other data may indicate timestamp data (e.g., date, day, hour, minute, second), a program identifier that indicates a program, and stay-time data that indicates a period of time during which a user remains on a channel. By way of example, this portion of network devices 110 may be implemented as a database management system or other form of repository system.

A portion of network devices 110 is capable of acquiring social network data. For example, social network data includes data that indicates degrees of social connection between users. A higher degree of social connection between users represents users having a closer social bond compared to a lower degree of social connection between users.

The social network data may be acquired by accessing social networks to which the users belong. For example, during an on-boarding process for users subscribing to the recommendation service, the users may indicate social networks to which the users belong and provide social network login information (e.g., user identifier, password, etc.). Additionally, or alternatively, social network data may be acquired by tracking user communications with other users via various services, such as, a telephone service, a mobile service, an Internet service, a television service, etc. For example, a frequency of communications may be indicative of a social similarity. By way of example, this portion of network devices 110 may be implemented as a social network aggregator device. The social network aggregator device may use well-known methods to digest social network data and assign degrees of social connection between users. For example, social network aggregator device may build a social graph based on the social network data or obtain a social graph from a social network site. The social network aggregator device calculates a social similarity value between the user of interest and other users in the social graph, as described herein. The social network aggregator device calculates a channel-interest similarity value between the user of interest and other users having a specified social similarity value based on the program historical data, as described herein. The social network aggregator device calculates a similarity index value based on the social similarity value and the channel-interest similarity.

A portion of network devices 110 is capable of calculating the regularity (e.g., daily, weekly, monthly, one-time, etc.) of a program. The regularity of a program may be calculated even when the program historical data does not include regularity data to indicate the regularity of a program, as described herein. Additionally, the regularity of a program may be calculated even when the program historical data does not include a program identifier pertaining to the program. By way of example, this portion of network devices 110 may be implemented as a data analytics system.

A portion of network devices 110 is capable of recommending a channel to a user. A recommendation may be generated based on the social network data, the program historical data, the regularity of programs, the stay-time, and the similarity index value. By way of example, this portion of network devices 110 may be implemented as a recommender engine.

User location 150 is a location of a user(s). For example, user location 150 may be a residence, a place of business, or other location in which a user (e.g., a mobile user) is located. Devices 160 include devices that interface with network 105, provide programs to users, or some combination thereof. For example, devices 160 may include a display device (e.g., a television, a smart television, a monitor), a set top box (e.g., a client device, a thin client device, a converter box, a receiver, a tuner, a digibox, an IPTV set top box), a server device (e.g., a media server that includes tuners), a mobile device (e.g., a smartphone, a tablet device, etc.), a vehicular communication system, an optical network termination device, a router, a modem, a computer (e.g., a desktop computer, a laptop computer, a netbook, a palmtop computer, etc.), an audio device (e.g., speaker, audio receiver, etc.), or other type of end user device (e.g., a Roku® box, Internet access devices, etc.). In some cases, devices 160 form a local area network (LAN).

Figure 2:
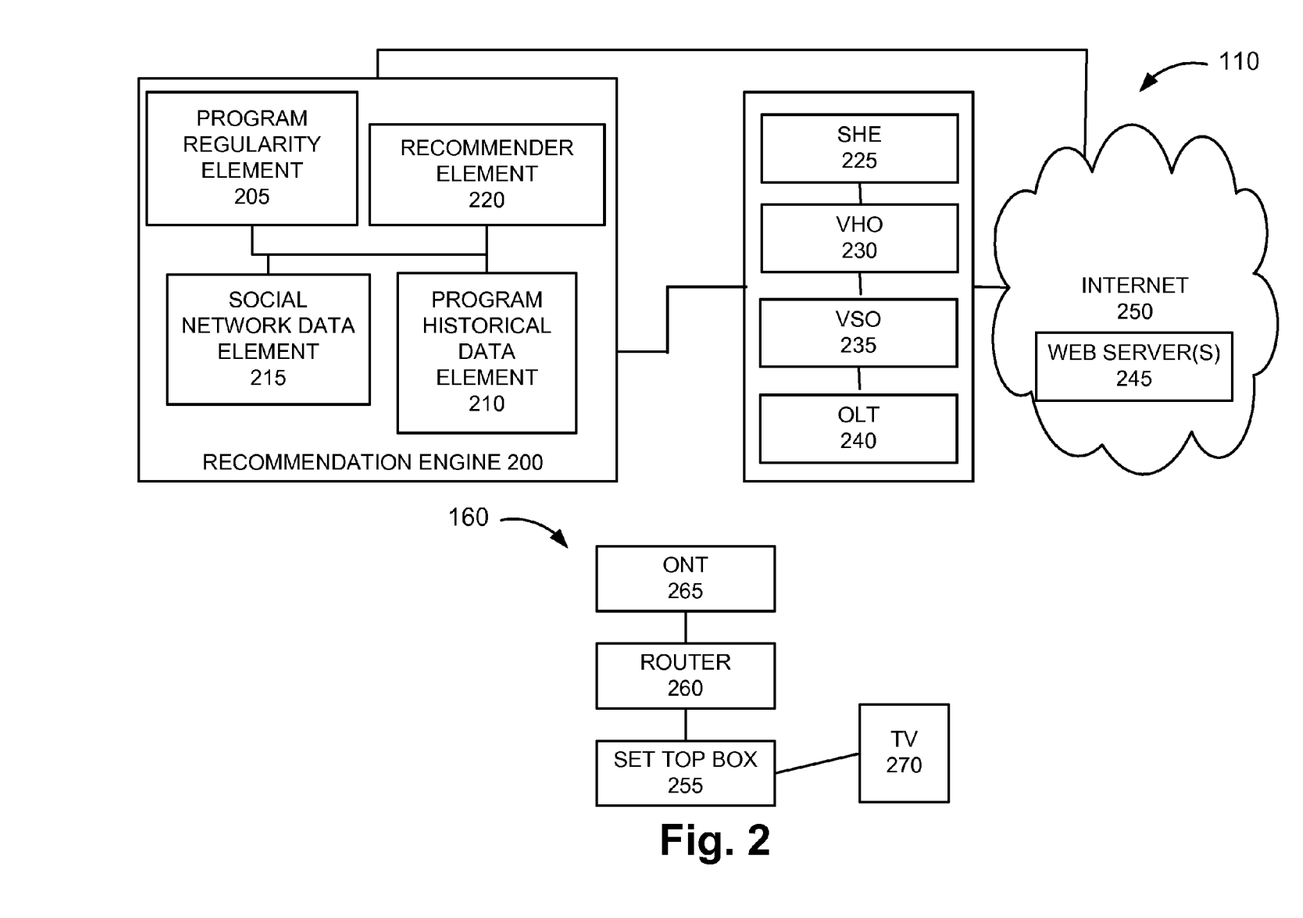
FIG. 2 is a diagram illustrating exemplary network elements and exemplary end user devices of FIG. 1.

FIG. 2 is a diagram illustrating exemplary network elements of network devices 110 and exemplary end user elements of devices 160. As illustrated network devices 110 include a recommendation engine 200. The recommendation engine 200 includes a program regularity element 205, a program historical data element 210, a social network data element 215, and a recommender element 220. Network devices 110 include a SHE 225, a VHO 230, a VSO 235, and an OLT 240. Network devices 110 also include web servers 245 in Internet 250. Additionally, as illustrated, devices 160 include a set top box 255, a router 260, an ONT 265, and a television (TV) 270.

The number of network elements, end user elements, and the configurations are exemplary. According to other embodiments, network devices 110 may include additional network elements, fewer network elements, different network elements, and/or differently arranged network elements, than those illustrated in FIG. 2. For example, network devices 110 may include network elements that provide other types of services or functions, such as Internet service, video streaming service, mobile service, or alternatively access to one or more of these various services or functions. Additionally, or alternatively, network devices 110 may include other types of program delivery infrastructures, which may not include one or more of OLT 240, etc., depending on the program delivery system. Network devices 110 may include network elements not specifically illustrated, such as switches, amplifiers, add/drop multiplexers, other types of intermediary network elements, etc. For example, VSO 235 may include gateway routers (GWRs), etc.

According to other embodiments, devices 160 may include additional end user elements, fewer end user elements, different end user elements, and/or differently arranged end user elements, than those illustrated in FIG. 2. For example, devices 160 may include a computer, a mobile device, a media server, a network interface element, etc. Additionally, or alternatively, devices 160 may not include one or more of ONT 265, etc., depending on the architecture implemented within user location 150.

Also, according to other embodiments, one or more functions and/or processes described as being performed by a particular network element may be performed by a different network element, or some combination of network elements, which may or may not include the particular network element. According to other embodiments, a single network element depicted in FIG. 2 may be implemented as multiple network elements. Conversely, multiple network elements depicted in FIG. 2 may be implemented as a single network element. The connections among the devices and network illustrated are exemplary. A connection may be direct or indirect and may involve intermediary device(s) and/or network(s) not illustrated in FIG. 2.

Recommendation engine 200 includes a network element that recommends channels to users based on a social network data, program historical data, a similarity index value, and other factors, as described herein. As previously described, recommendation engine 200 includes program regularity element 205, a program historical data element 210, a social network data element 215, and a recommender element 220.

Program regularity element 205 includes a network element that calculates a regularity of a program. The regularity of a program indicates how often the program is available to the user over a period of time or how often the program was digested by the user over a period of time. By way of example, the regularity of a program may be indicated as daily, weekly, monthly, bi-weekly, bi-monthly, or one-time. Program regularity element 205 may calculate the regularity in various ways depending on the data included in the program historical data.

According to an exemplary implementation, the program historical data may include regularity data. For example, the program service provider may provide channel information to users. The channel information may indicate channel(s), programs available on the channel(s), and times. Additionally, the channel information may indicate the regularity of the programs. The program historical data may include the channel information. In this way, program regularity element 205 calculates the regularity of a program based on selecting and interpreting the regularity data.

According to another exemplary implementation, the program historical data does not include regularity data. For purposes of description, assume the program historical data is stored on set top box 255 and spans a seven day period. Program regularity element 205 identifies each channel i and generates a program list $L_i$ for each day (e.g., $L_1$-$L_7$). Program regularity element 205 selects a program included in one program list (e.g., $L_1$) of channel i and determines whether the program is included in the other six program lists (e.g., $L_2$-$L_7$) of channel i. As a result of a comparison between program lists, program regularity element 205 may determine, for example, that the program included in program list $L_1$ of channel i is present in each of the program lists $L_2$-$L_7$ of channel i. Accordingly, program regularity element 205 determines that the program is a daily program. According to another scenario, program regularity element 205 may determine that the program included in program list $L_1$ of channel i is not present in any of the program lists $L_2$-$L_7$ of channel i. Accordingly, program regularity element 205 determines that the program is a weekly program. According to yet another scenario, program regularity element 205 may determine that the program included in program list $L_1$ of channel i is present in some, but not all of the program lists $L_2$-$L_7$ of channel i. Accordingly, program regularity element 205 determines that the program is a bi-weekly, tri-weekly, etc.

According to yet another exemplary implementation, even if program regularity element 205 is unable to obtain program historical data that includes program data (e.g., program identifiers, metadata, etc.), program regularity element 205 calculates program regularity based on an aggregation of program historical data from users. For example, program regularity element 205 is able to extract channel data (e.g., channel identifiers) and time data (e.g., start times and end times) indicating a period of time users digested programs available on the channels during that period of time.

Figure 4:
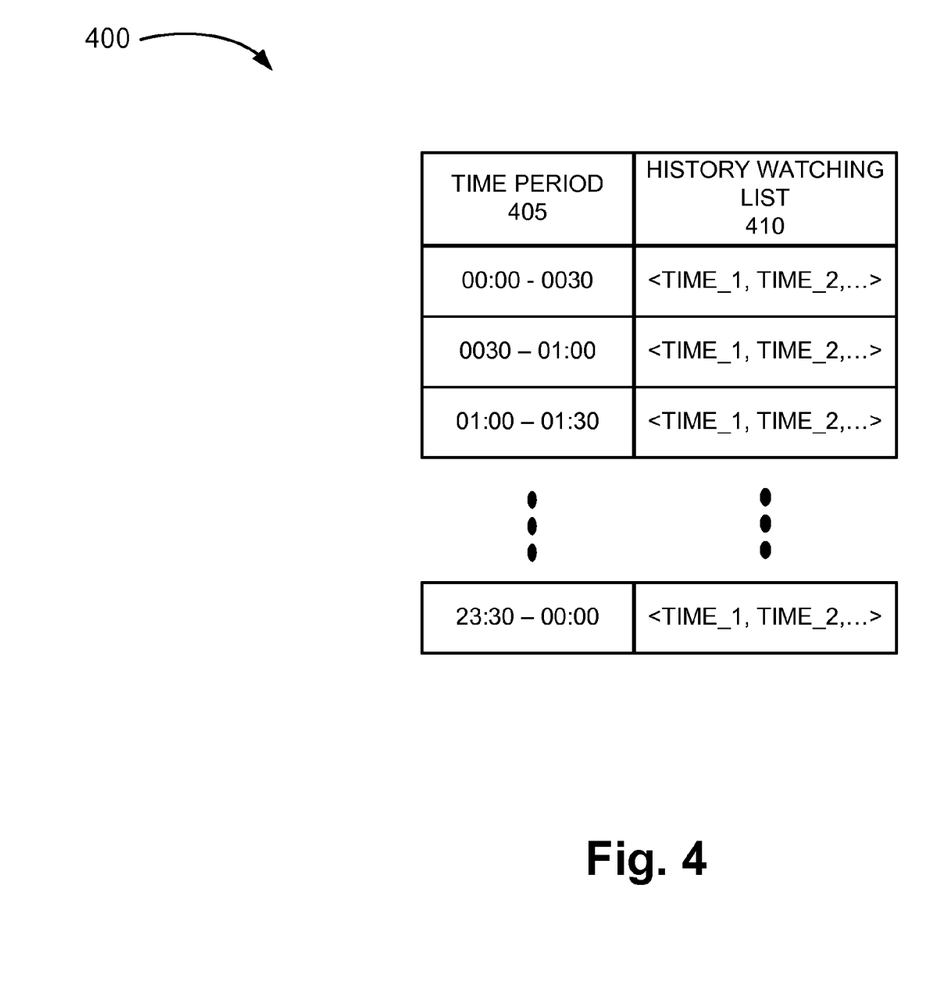
FIG. 4 is a diagram illustrating an exemplary table pertaining to program regularity.

Typically, most programs will last at least 30 minutes, so program regularity element 205 uses a 30 minute time period as a base level of granularity. For example, for a 24 hour period (i.e., one day), program regularity element 205 divides the 24 hour period into 48 half-hour periods. Program regularity element 205 filters the program historical data according to each 30 minute time period. For example, FIG. 4 is a diagram illustrating an exemplary table 400. The program historical data stored in a history watching list field 410 is digested during the time period indicated in a time period field 405.

Program regularity element 205 assumes that during each 30 minute time period, the channel is presenting a different program. If one program lasts longer, then multiple timer periods include the same program. For purposes of description, assume program regularity element 205 is processing one row of table 400. For each time tag, program regularity element 205 extracts the week day, day, hour, and minute. Program regularity element 205 calculates the number of time tags that have the same week day and multiplies that number by a user similarity value. The user similarity value represents a similarity between the user of interest and another user to which the program historical data pertains. The larger the number of time tags used provides a higher probability of identifying regularity. For example, a program that is digested during the 00:00-00:30 time period, each Monday, is probably a weekly program. According to an exemplary implementation, program regularity element 205 calculates a weight for each day of the week. Below are exemplary expressions:

$$W_{MONDAY} = \Sigma_{i=1}^{N}(\text{IsMonday}(T_i) * S_{user\_of\_T_i}) \quad (1)$$

$$\text{IsMonday}(T_i) = \{1 T_i \text{ is Monday}, \{0 O \cdot W \quad (2)$$

in which the user collection is $\{U_1, U_2, \ldots U_N\}$ and in total N+1 users including the user of interest U, the time tag collection is $\{T_1, T_2, \ldots T_K\}$, total K time tags in the row, and $S_{user\_of\_T_i}$ is the user similarity between the user of interest and the user associated with time tag $T_i$. Then, for the weekly programs that happen on Monday, $W_{MONDAY}$ is the resulting weight for Monday.

Program regularity element 205 calculates weights for the other days of the week (i.e., $W_{TUESDAY}$, $W_{WEDNESDAY}$, $W_{THURSDAY}$, $W_{FRIDAY}$, $W_{SATURDAY}$, and $W_{SUNDAY}$) by performing the same calculation, as described above. Program regularity element 205 compares the seven weight values. If all of the weight values are the same, program regularity element 205 interprets this to mean that the program is a daily program. Otherwise, the program may be deemed as a weekly program or provided multiple times during the week. According to a scenario in which program regularity element 205 interprets that a program is a daily program (e.g., all the weight values are very large), the programs that are presented on different days may be different. However, such a circumstance is not an issue since recommendation engine 200 recommends a channel instead of a program. That is, if the weight value of that time for a channel is larger, recommendation engine 200 can recommend that channel even if the channel presents a different program on different days.

According to the example above, program regularity element 205 calculates the regularity of a program within a week time period. However, program regularity element 205 may calculate the regularity of a program within other time periods (e.g., monthly, yearly, semi-annually, etc.). As described herein, according to an exemplary embodiment, when program regularity data is not available, program regularity element 205 uses the program historical data of other users that have a social network connection to the user of interest to identify program regularity.

According to an exemplary embodiment, for different program regularities associated with programs, program regularity element 205 calculates different weights. By way of example, if the program regularity of a program is weekly, then the channel is assigned a higher priority relative to a daily program because of the low frequency of availability. For purposes of description, assume a one week time span as a parameter for calculating weight and priority. According to such circumstances, program regularity element 205 calculates the weight and the priority based on the following exemplary expression in which the weight of the program has a reciprocal relationship to the number of times the program is available during the one week time span:

$$w = \frac{1}{P}, \quad (3)$$

in which w is the program weight and P is the number of times the program is available.

Program historical data element 210 includes a network element that manages and stores program historical data. Program historical data element 210 may be implemented by a computer and a storage device. For example, program historical data element 210 may be implemented as a database management system (e.g., a database management engine, a data definition subsystem, etc.) or an advanced database management system.

According to an exemplary implementation, the program historical data includes tuning data of set top box 255. The tuning data may include channel identifier data. The channel identifier data identifies a channel by name (e.g., network name (e.g., NBC), etc.)), number (e.g., 920, etc.), network address (e.g., URL), or other suitable nomenclature. The tuning data may also include timestamp data (e.g., date (e.g., year, month, day), hour, minute, seconds) that indicates a time when set top box 255 first tunes to a channel. Additionally, the tuning data may include stay-time data. For example, the stay-time data indicates a time period (e.g., 32 minutes, 1 hour and 6 minutes, etc.) in which set top box 255 remains tuned to the channel. By way of further example, program historical data may include a device identifier (e.g., a network address, a serial number, an equipment identifier, etc.) pertaining to set top box 255, a user identifier (e.g., login data, user name, etc.), a program identifier (e.g., a program name, a numerical or alphanumerical string, etc.), attributes of the program (e.g., high-definition, standard definition, 3-D, genre (e.g., comedy, etc.), etc.), type of channel (e.g., Quadrature Amplitude Modulation (QAM), IPTV, etc.), or some combination thereof. According to another implementation, the program historical data includes program server data. For example, a program server device in VSO 235 may provide programs of a channel to a user via set top box 255. The program server data may include data similar to the tuning data.

Program historical data element 210 may obtain program historical data using push or pull data delivery methods. Program historical data element 210 may obtain program historical data in real-time or on a scheduled basis. Due to scaling issues, program historical data element 210 limits the amount of program historical data stored on behalf of a user based on a storage allocation limit assigned to each user or other well-known method.

Figure 5:
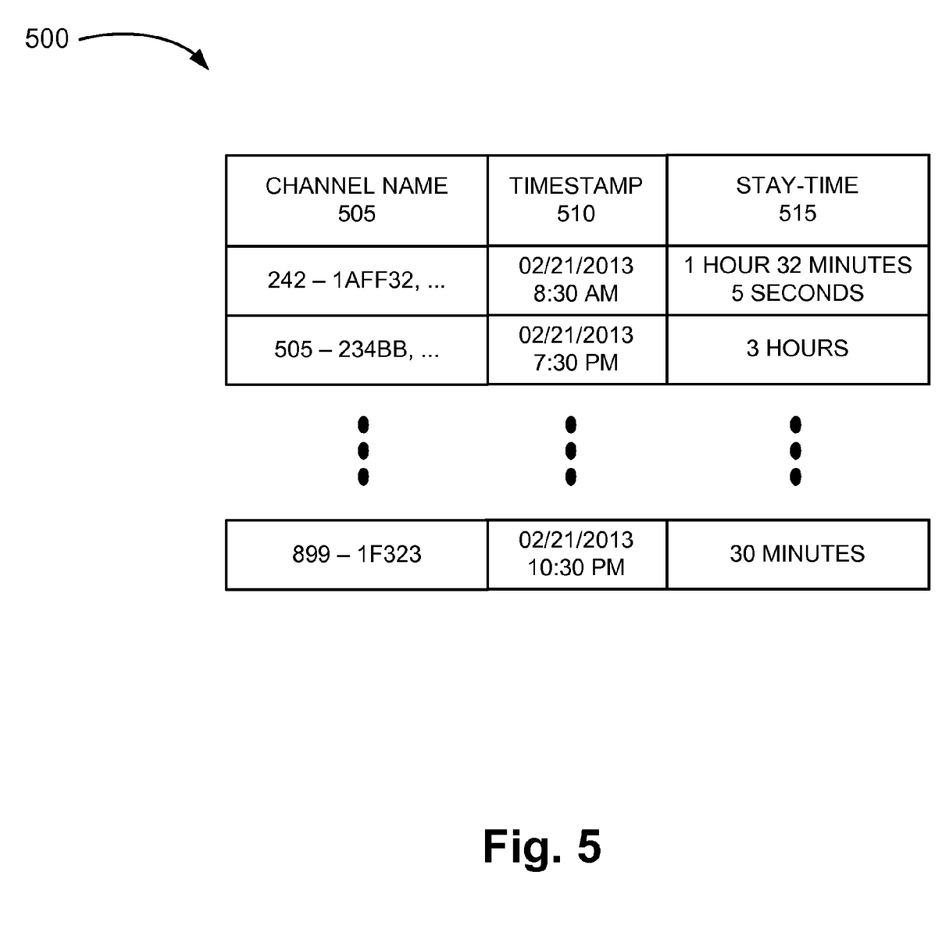
FIG. 5 is a diagram illustrating an exemplary table pertaining to program historical data.

FIG. 5 is a diagram illustrating an exemplary table 500 that stores program historical data. Channel name field 505 stores channel name data. Channel name data may include channel identifiers, program identifiers, or a combination thereof. The program identifiers may be mapped to metadata associated with the programs (e.g., title of program, description, actors, genre, etc.). Timestamp field 510 stores timestamp data, such as date and time. Stay-time field 515 stores data indicating a period of time a user remains on a channel.

According to an exemplary embodiment, program historical data element 210 maps program historical data to a particular user based on the device identifier included in the program historical data. Alternatively, according to an exemplary embodiment, program historical data element 210 maps program historical data to a particular user based on the user identifier. For example, a user may login or indicate his or her identity before or during the receipt of a program on a channel. For example, when considering set top box 255 as an end user device, set top box 255 may be located in a user's bedroom. According to such instances, the device identifier of set top box 255 may be used to identify the user. According to other instances, when set top box 255 may be located in common area (e.g., living room or family room), the ability to identify the user may be problematic in a household that includes multiple users. According to an exemplary implementation, the user may be prompted to log in to the recommendation service or via an invocation of the recommendation service (e.g., via a menu system displayed on television 270, pushing a button on a remote control device (e.g., a television remote control device, a set top box remote control device, etc.)), or other user input, the user may be identified.

According to yet another exemplary embodiment, program historical data element 210 does not associate program historical data to a particular user. Rather, program historical data element 210 associates program historical data to a group of users (e.g., more than one user).

Social network data element 215 includes a network element that manages and stores social network data. Social network data element 215 may also calculate a social similarity value between users. Social network data element 215 may be implemented by a computer and a storage device. Social network data element 215 includes the functions of a social network aggregator, as previously described.

Figure 6:
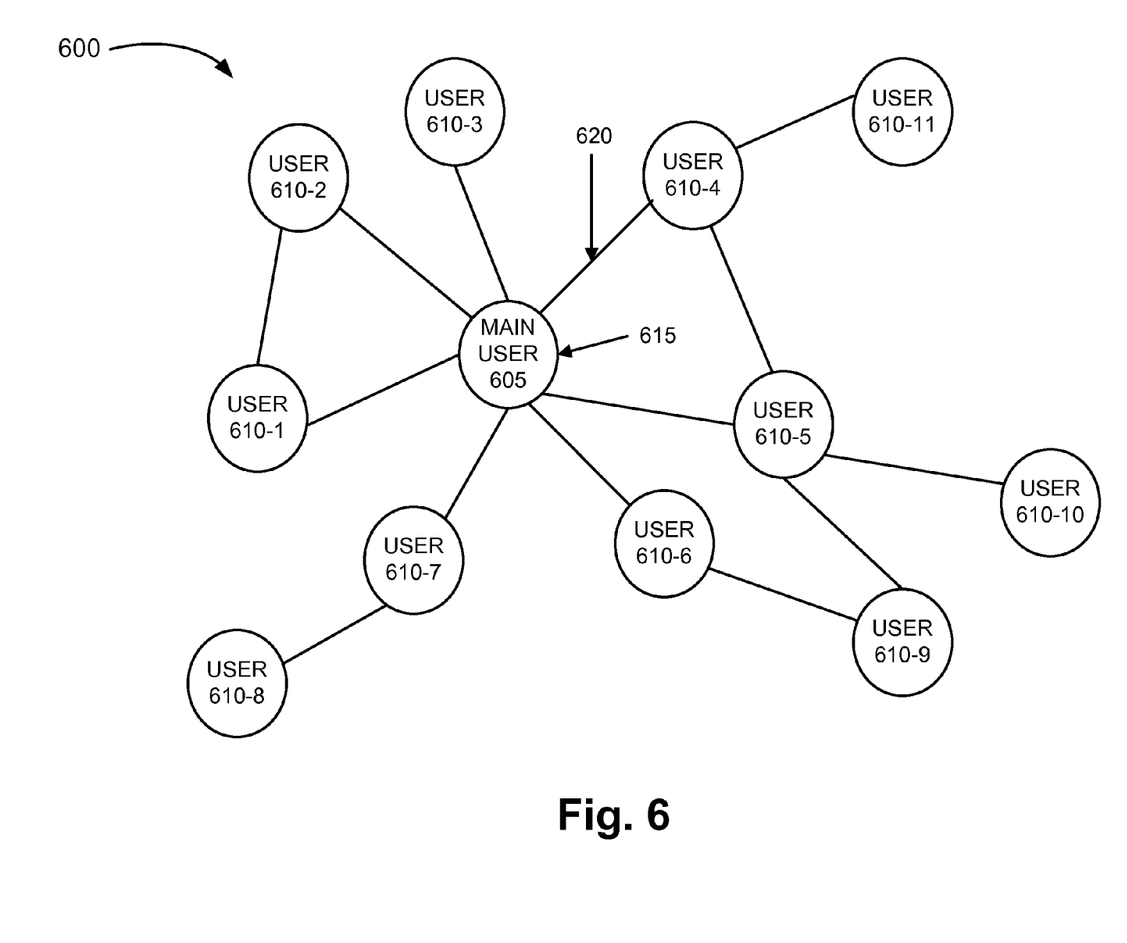
FIG. 6 is a diagram illustrating an exemplary social graph.

FIG. 6 is a diagram illustrating an exemplary social network graph 600. Social network graph 600 includes multiple nodes and links. As illustrated, a main user 605 (represented in node 615) is the person of interest and other users 610-1 through 610-11 have a social connection, directly or indirectly, to main user 605. The links connecting the nodes represent the degree of social connection between the connected nodes. For example, a link 620 represents the degree of social connection (e.g., social bond) between main user 605 and user 610-4.

As previously described, social network data element 215 calculates a social similarity value between users. Referring to FIG. 6, main user 605 and user 610-4 are directly connected. According to an exemplary implementation, the distance between main user 605 and user 610-4 may be assigned a value of one and may represent a large or high social similarity. User 610-11 is connected to main user 605 through user 610-4. Thus, the distance between main user 605 and user 610-11 may be assigned a value of two and may represent a smaller or lower social similarity relative to user 610-4. According to an exemplary implementation, social network data element 215 may calculate the social similarity value based on the following exemplary expression:

$$S_1(U_1, U_2) = \frac{1}{\text{Shortest\_weighted\_dist}(U_1, U_2)}, \quad (4)$$

in which $U_1$ and $U_2$ represent users in the social graph. According to other implementations, social network data element 215 may calculate a social similarity value between users based on other well-known methods.

Recommender element 220 includes a network element that generates channel recommendations. As previously described, according to an exemplary embodiment, a channel recommendation is based on a similarity index value. According to an exemplary implementation, recommender element 220 calculates a channel-interest similarity value. The channel-interest similarity value and the social similarity value are used to calculate the similarity index value, as described further below.

The channel-interest similarity value represents a similarity between the user of interest and another user in relation to a channel. Recommender element 220 may receive program historical data from program regularity element 205 or program historical data element 210. Program regularity element 205 or recommender element 220 may identify commonality data pertaining to the program historical data. For example, the commonality data indicates similarity between users in terms of, for example, channels digested, times digested, etc. The commonality data may also include average times that a user digests all programs of a channel(s). For example, assume for users $U_1$ and $U_2$, a common program historical data $C_1$ is obtained. Recommender element 220 calculates a channel-interest similarity value. According to an exemplary implementation, recommender element 220 calculates the channel-interest similarity value based on the following exemplary expression:

$$S_2(U_1 U_2) = sizeof(C_1) \frac{\sum_{i \in c_1}(\Delta_{1,i} - \overline{\Delta_1})(\Delta_{2,i} - \overline{\Delta_2})}{\sqrt{\sum_{i \in c_1}(\Delta_{1,i} - \overline{\Delta_1})^2 \sum_{i \in c_1}(\Delta_{2,i} - \overline{\Delta_2})^2}}, \quad (5)$$

in which $\Delta_{1,i}$ is the time $U_1$ stays with program i, $\Delta_{2,i}$ is the time $U_2$ stays with program i, $\overline{\Delta_1}$ is the average time $U_1$ stays with all programs, and $\overline{\Delta_2}$ is the average time $U_2$ stays with all programs. According to another exemplary implementation, recommender element 220 calculates the channel-interest similarity value based on the following exemplary expression:

$$S_2(U_1 U_2) = sizeof(C_1) \frac{\sum_{i \in c_1} \Delta_{1,i} \Delta_{2,i}}{\sqrt{\sum_{i \in c_1} \Delta_{1,i}^2 \sum_{i \in c_1} \Delta_{1,i}^2}}. \quad (6)$$

Recommender element 220 calculates the similarity index value based on the social similarity $S_1$, which is obtained from social network data element 215, and the channel-interest similarity $S_2$ based on the following exemplary expression:

$$S = S_1 * S_2. \quad (7)$$

Recommender element 220 calculates weight values for channels. According to an exemplary implementation, recommender element 220 calculates a weight value W for the channel based on the following exemplary expression:

$$W = w * \Sigma_{i=1}^{N}(\text{Stay\_time}(U_i) * S_i), \quad (8)$$

in which w is the regularity weight (obtained from program regularity element 205), N is the total number of users, Stay_time is the time user $U_i$ stays on the channel (obtained from program historical data element 210), and $S_i$ is the similarity index value between the user of interest and the user $U_i$. After the weight values W for channels are calculated, recommender element 220 sorts the weight values W and selects the top N channels for recommendation to the user. Recommendation engine 200 pushes the recommended channels to the user. For example, a list of one or multiple channels may be provided to the user.

According to an exemplary embodiment, recommender element 220 may obtain future program schedules and use this information to recommend a channel. For example, a program schedule may include electronic program guide (EPG) information, which includes program and channel information. Recommender element 220 may also obtain future program schedules of on-line channels from on-line program provides (e.g., YouTube, etc.).

SHE 225, VHO 230, VSO 235, and OLT 240 include network elements that digest programs from program providers and distribute the programs on channels to users. For example, SHE 225, VHO 230, VSO 235, and OLT 240 may operate as a television distribution network that provides IPTV and digital channels. Network element(s) of recommendation engine 200 may communicate with SHE 225, VHO 230, VSO 235, OLT 240, or some combination thereof, to obtain program historical data, social network data, or both. SHE 225, VHO 230, VSO 235, OLT 240, or some combination thereof also is communicatively coupled to Internet 250. Web server(s) 245 may provide on-line program channels to users. Web server(s) 245 may also include social network sites. Network element(s) of recommendation engine 200 may be communicatively coupled to Internet 250. For example, social network data element 215 may obtain social network data from social network sites on Internet 250. Additionally, or alternatively, program historical data element 210 may obtain program historical data from web server(s) 245 regarding on-line channels digested by users.

Set top box 255 includes an end user element, such as a converter box, a television receiver, a tuner device, a digibox device, an Internet Protocol (IP) set top box, an IPTV set top box, and/or some other form of a set top box. Router 260 includes an end user element, such as an in-home router device, a broadband router, or a wireless router. ONT 265 includes an end user element of a conventional ONT. Television 270 includes an end user element, such as a television or a smart television.

Figure 3:
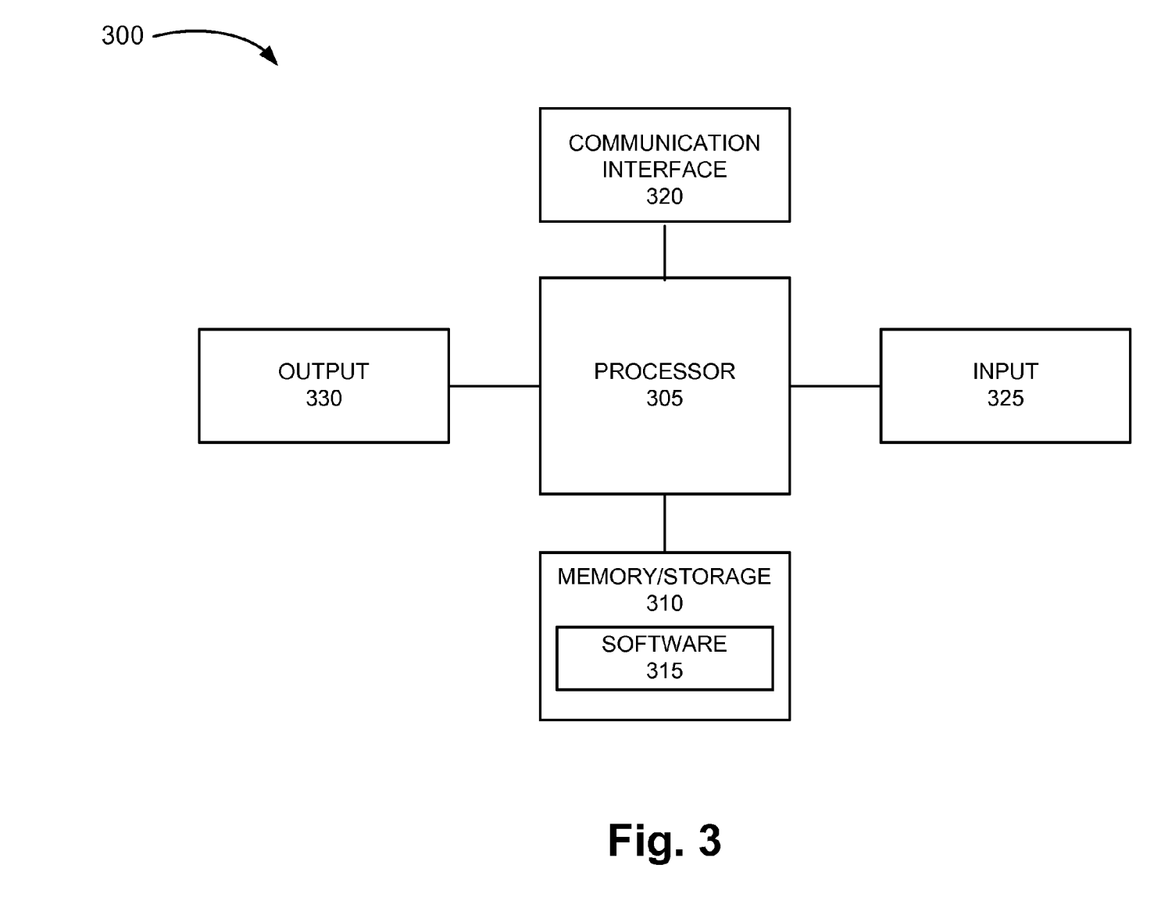
FIG. 3 is a diagram illustrating exemplary components of a device that may correspond to one or more of the devices previously depicted.

FIG. 3 is a diagram illustrating exemplary components of a device 300 that may correspond to one or more of the devices depicted in the previous Figures. As illustrated, according to an exemplary embodiment, device 300 includes a processor 305, memory/storage 310, software 315, a communication interface 320, an input 325, and an output 330. According to other embodiments, device 300 may include fewer components, additional components, different components, and/or a different arrangement of components than those illustrated in FIG. 3 and described herein.

Processor 305 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., memory/storage 310), etc.

Processor 305 may control the overall operation or a portion of operation(s) performed by device 300. Processor 305 may perform one or multiple operations based on an operating system and/or various applications or programs (e.g., software 315). Processor 305 may access instructions from memory/storage 310, from other components of device 300, and/or from a source external to device 300 (e.g., a network, another device, etc.).

Memory/storage 310 may include one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 may include an application or a program that provides a function and/or a process. Software 315 may include firmware. For example, recommendation engine 200, which includes program regularity element 205, program historical data element 210, social network data element 215, and recommender element 200, may be implemented using one or more program(s) and/or application(s). Additionally, for example, one or more program(s) and/or application(s) may be used to display user interfaces (e.g., set top box 255, television 270, etc.), communicate with other devices, etc. Also, for example, other devices may be implemented with software 315 to provide a function and/or a process described herein.

Communication interface 320 may permit device 300 to communicate with other devices, networks, systems, etc. Communication interface 320 may include one or multiple wireless interfaces and/or wired interfaces. Communication interface 320 may include one or multiple transmitters, receivers, and/or transceivers. Communication interface 320 may operate according to one or multiple protocols, standards, and/or the like.

Input 325 may permit an input into device 300. For example, input 325 may include a keyboard, a mouse, a display, a touchscreen, a touchless screen, a button, a switch, an input port, speech recognition logic, and/or some other type of visual, auditory, tactile, etc., input component. Output 330 may permit an output from device 300. For example, output 330 may include a speaker, a display, a touchscreen, a touchless screen, a light, an output port, and/or some other type of visual, auditory, tactile, etc., output component.

Device 300 may perform processes and/or functions, as described herein, in response to processor 305 executing software 315 stored by memory/storage 310. By way of example, instructions may be read into memory/storage 310 from another memory/storage 310 or from another device via communication interface 320. The instructions stored by memory/storage 310 may cause processor 305 to perform one or more processes described herein. Alternatively, for example, according to other implementations, device 300 may perform one or more processes described herein based on the execution of hardware (processor 305, etc.).

Figure 7A:
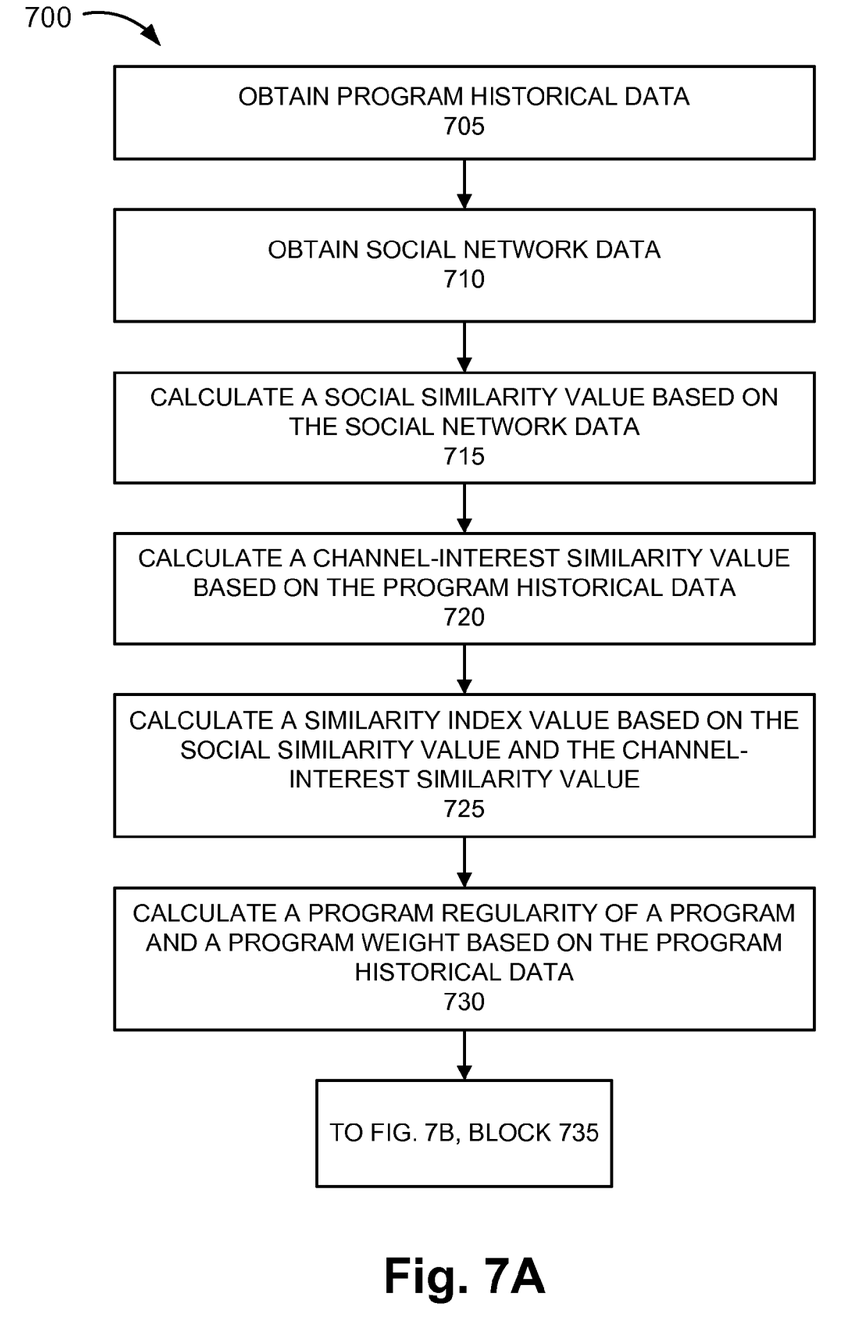
FIGS. 7A and 7B are flow diagrams illustrating an exemplary process to generate channel recommendations.
Figure 7B:
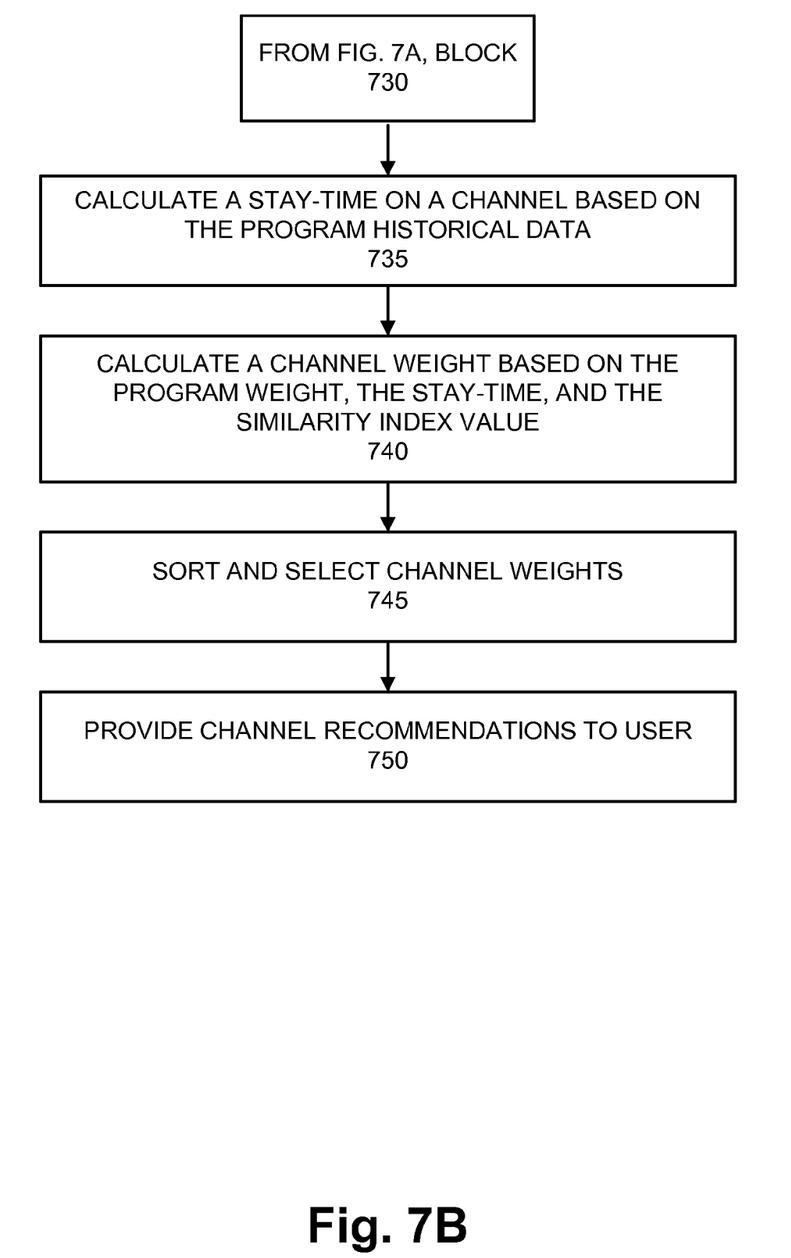

FIGS. 7A and 7B is a flow diagram illustrating an exemplary process 700 for generating channel recommendations according to an exemplary embodiment. A step or an act described in process 700 is performed by recommendation engine 200. For example, processor 305 may execute software 315 to perform the step or the act described.

Referring to FIG. 7A, in block 705, program historical data is obtained. For example, program historical data element 210 obtains program historical data from set top boxes 255 or program servers (e.g., web server 245, video server of VSO 235, etc.).

In block 710, social network data is obtained. For example, social network data element 215 obtains social network data from web server 245. Social network data element 215 may also obtain social network data from set top box 255. For example, a program service may provide various user interfaces (e.g., menus, widgets, etc.) to access a social network.

In block 715, a social similarity value is calculated based on the social network data. For example, social network data element 215 calculates a social similarity value based on a social graph. Social network data element 215 may use well-known techniques to measure social similarity between the user of interest and other users. Social network data element 215 may use other data, such as communication history (e.g., mobile phone calls, e-mails, tweets, etc.), user profile information associated with the program service or other accessible service account, to calculate a social similarity value.

In block 720, a channel-interest similarity value is calculated based on the program historical data. For example, recommender element 220 calculates a channel-interest similarity value based on equation (5) or equation (6), as previously described.

In block 725, a similarity index value is calculated based on the social similarity value and the channel-interest similarity value. For example, recommender element 220 uses the social similarity value and the channel-interest similarity value to calculate the similarity index value based on equation (7).

In block 730, a program regularity of a program and a program weight is calculated based on the program historical data. For example, program regularity element 205 calculates a program regularity for each program of the program historical data, as previously described.

Referring to FIG. 7B, in block 735, a stay-time on a channel is calculated based on the program historical data. For example, program historical data element 210 calculates a stay-time value that indicates the time period a user stays on a particular channel.

In block 740, a channel weight is calculated based on the program weight, the stay-time on a channel value, and the similarity index value. For example, recommender element 220 calculates the channel weight based on equation (8), as previously described.

In block 745, channel weights are sorted and selected. For example, recommender element 220 sorts the channel weights and selects N top channels to recommend to a user.

In block 750, channel recommendations are provided to a user. For example, recommendation engine 200 provides a list of recommended channels to the user via a user interface.

Although FIGS. 7A and 7B illustrate an exemplary process 700 to generate channel recommendations, process 700 may include additional operations, fewer operations, and/or different operations than those illustrated in FIGS. 7A and 7B and described herein.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIGS. 7A and 7B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 305, etc.) or a combination of hardware and software (e.g., software 315). The embodiments have been described without reference to the specific software code since software can be designed to implement the embodiments based on the description herein.

Additionally, embodiments described herein may be implemented as a non-transitory storage medium that stores data and/or information, such as instructions, program code, data structures, program modules, an application, etc. For example, a non-transitory storage medium includes one or more of the storage mediums described in relation to memory/storage 310.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive. For example, the recommendation engine may include a statistical analytics engine to evaluate the users' responses to the recommended channels. The feedback information may be used to identify which programs are most-viewed or the best "money-makers," and in turn, ad-insertions, etc., may be targeted toward these channels.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:

obtaining, by a recommendation engine device, program historical data associated with users that each receive one or more programs via one or more channels of a program delivery network that provides a program service to which the users belong;

obtaining, by the recommendation engine device, social network data associated with the users from social network sites to which the users belong, wherein the social network data includes a social graph, communication data pertaining to communications between the users via a communication network that provides a communication service to which the users belong, wherein the communication service includes a mobile phone service and a messaging service, and the communication data includes mobile phone calls, and user profile information pertaining to the users;

calculating based on the social network data, the communication data, and the user profile information, by the recommendation engine device, a social similarity value that indicates a social similarity between one of the users and other users;

calculating based on the program historical data, by the recommendation engine device, a channel-interest similarity value that indicates a common interest between the one of the users and the other users in relation to the one or more channels used by the users to receive the one or more programs;

calculating based on the social similarity value and the channel-interest similarity value, by the recommendation engine device, a similarity index value that indicates a similarity between the one of the users and the other users;

calculating based on the program historical data, by the recommendation engine device, a program regularity value, for each program, that indicates a regularity of consumption of each program over a time period;

calculating based on the program regularity value, by the recommendation engine device, a program weight value, for each program, that indicates a priority value;

calculating based on the program historical data, by the recommendation engine device, a stay-time, for each channel, that indicates a time period each of the users remained on each channel;

calculating based on each program weight value, each stay-time, and each similarity index value, by the recommendation engine device, a channel weight for each channel; and selecting based on each channel weight, by the recommendation engine device, one or more channels to recommend to at least one of the users.

2. The method of claim 1, wherein the one or more channels of the program historical data include an Internet Protocol Television channel or an on-line channel.

3. The method of claim 1, wherein the calculating of the channel-interest similarity value is based on an expression:

$$S_2(U_1 U_2) = sizeof(C_1) \frac{\sum_{i \in c_1} (\Delta_{1,i} - \overline{\Delta_1})(\Delta_{2,i} - \overline{\Delta_2})}{\sqrt{\sum_{i \in c_1} (\Delta_{1,i} - \overline{\Delta_1})^2 \sum_{i \in c_1} (\Delta_{2,i} - \overline{\Delta_2})^2}},$$

wherein $C_1$ is a common program historical data between the one of the users and one of the other users, $U_1$ is the one of the users, $U_2$ is one of the other users, $\Delta_{1,i}$ is a time $U_1$ stays with program i, $\Delta_{2,i}$ is a time $U_2$ stays with program i, $\overline{\Delta_1}$ is an average time $U_1$ stays with all of the programs, $\overline{\Delta_2}$ is an average time $U_2$ stays with all of the programs, and $S_2$ is the channel-interest similarity value, and wherein the common program historical data includes channels digested and times digested.

4. The method of claim 1, wherein the calculating of the similarity index value comprises:

multiplying the social similarity value with the channel-interest similarity value, and wherein a product of the multiplying is the similarity index value.

5. The method of claim 1, wherein the calculating of the program regularity value comprises:

filtering the program historical data into 30 minute periods of a day;

calculating a number of time tags included in the program historical data for each 30 minute period; and calculating a probability of program regularity, wherein the program historical data does not include program identifiers and does not include regularity data that indicates a regularity of a program.

6. The method of claim 1, wherein the calculating of the channel weight is based on an expression:

$W = w * \Sigma_{i=1}^{N} (Stay\_time(U_i) * S_i)$, wherein w is the program regularity value, Stay_time is a time user $U_i$ stays on a channel, $S_i$ is the similarity index value between the one of the users and one of the other users $U_i$, and W is the channel weight.

7. The method of claim 1, further comprising:

transmitting a list of the selected one or more channels to at least one user device associated with the at least one of the users.

8. The method of claim 1, wherein the one or more programs include a television program.

9. A recommendation system comprising:

one or more communication interfaces;

one or more memories that store instructions; and one or more processors to execute the instructions to:

obtain, via at least one of the one or more communication interfaces, program historical data associated with users that each receive one or more programs via one or more channels of a program delivery network that provides a program service to which the users belong;

obtain, via at least one of the one or more communication interfaces, social network data associated with the users from social network sites to which the users belong, wherein the social network data includes a social graph, communication data pertaining to communications between the users via a communication network that provides a communication service to which the users belong, wherein the communication service includes a mobile phone service and a messaging service, and the communication data includes mobile phone calls, and user profile information pertaining to the users;

calculate based on the social network data, the communication data, and the user profile information, a social similarity value that indicates a social similarity between one of the users and other users;

calculate based on the program historical data, a channel-interest similarity value that indicates a common interest between the one of the users and the other users in relation to the one or more channels used by the users to receive the one or more programs;

calculate based on the social similarity value and the channel-interest similarity value, a similarity index value that indicates a similarity between the one of the users and the other users;

calculate based on the program historical data a program regularity value, for each program, that indicates a regularity of consumption of each program over a time period;

calculate based on the program regularity value, a program weight value, for each program, that indicates a priority value;

calculate based on the program historical data, a stay-time, for each channel, that indicates a time period each of the users remained on each channel;

calculate based on each program weight value, each stay-time, and each similarity index value, a channel weight for each channel; and select based on each channel weight, one or more channels to recommend to at least one of the users.

10. The recommendation system of claim 9, wherein the one or more channels of the program historical data include a digital television channel or an on-line channel.

11. The recommendation system of claim 9, wherein when calculating the channel-interest similarity value, at least one of the one or more processors to execute the instructions to:
calculate the channel-interest similarity value based on an expression:

$$S_2(U_1 U_2) = sizeof(C_1) \frac{\sum_{i \in c_1}(\Delta_{1,i} - \overline{\Delta_1})(\Delta_{2,i} - \overline{\Delta_2})}{\sqrt{\sum_{i \in c_1}(\Delta_{1,i} - \overline{\Delta_1})^2 \sum_{i \in c_1}(\Delta_{2,i} - \overline{\Delta_2})^2}},$$

wherein $C_1$ is a common program historical data between the one of the users and one of the other users, $U_1$ is the one of the users, $U_2$ is one of the other users, $\Delta_{1,i}$ is a time $U_1$ stays with program i, $\Delta_{2,i}$ is a time $U_2$ stays with program i, $\overline{\Delta_1}$ is an average time $U_1$ stays with all of the programs, $\overline{\Delta_2}$ is an average time $U_2$ stays with all of the programs, and $S_2$ is the channel-interest similarity value, and wherein the common program historical data includes channels digested and times digested.

12. The recommendation system of claim 9, wherein when calculating the similarity index value, at least one of the one or more processors to execute the instructions to:
multiply the social similarity value with the channel-interest similarity value, and wherein a product of a multiplication is the similarity index value.

13. The recommendation system of claim 9, wherein when calculating the program regularity value, at least one of the one or more processors to execute the instructions to:
filter the program historical data into 30 minute periods of a day;
calculate a number of time tags included in the program historical data for each 30 minute period; and
calculate a probability of program regularity, wherein the program historical data does not include program identifiers and does not include regularity data that indicates a regularity of a program.

14. The recommendation system of claim 9, wherein when calculating the channel weight, at least one of the one or more processors to execute the instructions to:
calculate the channel weight based on an expression:
$W = w * \sum_{i=1}^{N}(Stay\_time(U_i) * S_i)$, wherein w is the program regularity value, Stay_time is a time user $U_i$ stays on a channel, $S_i$ is the similarity index value between the one of the users and one of the other users $U_i$ and W is the channel weight.

15. The recommendation system of claim 9, at least one of the one or more processors to execute the instructions to:
transmit, via at least one of the one or more communication interfaces, a list of the selected one or more channels to at least one user device associated with the at least one of the users.

16. The recommendation system of claim 9, wherein the one or more programs include a television program.

17. A non-transitory storage medium storing instructions executable by a computational device, wherein the instructions comprise instructions to:
obtain program historical data associated with users that each receive one or more programs via one or more channels of a program delivery network that provides a program service to which the users belong;
obtain social network data associated with the users from social network sites to which the users belong, wherein the social network data includes a social graph, communication data pertaining to a frequency of communications between the users via a communication network that provides a communication service to which the users belong, wherein the communication service includes a mobile phone service and a messaging service, and the communication data includes mobile phone calls, and user profile information pertaining to the users;
calculate based on the social network data, the communication data, and the user profile information, a social similarity value that indicates a social similarity between one of the users and other users;
calculate based on the program historical data, a channel-interest similarity value that indicates a common interest between the one of the users and the other users in relation to the one or more channels used by the users to receive the one or more programs;
calculate based on the social similarity value and the channel-interest similarity value, a similarity index value that indicates a similarity between the one of the users and the other users;
calculate based on the program historical data a program regularity value, for each program, that indicates a regularity of consumption of each program over a time period;
calculate based on the program regularity value, a program weight value, for each program, that indicates a priority value;
calculate based on the program historical data, a stay-time, for each channel, that indicates a time period each of the users remained on each channel;
calculate based on each program weight value, each stay-time, and each similarity index value, a channel weight for each channel; and
select based on each channel weight, one or more channels to recommend to at least one of the users.

18. The non-transitory storage medium of claim 17, wherein the instructions to calculate the channel-interest similarity value comprise instructions to:
calculate the channel-interest similarity value based on an expression:

$$S_2(U_1 U_2) = sizeof(C_1) \frac{\sum_{i \in c_1}\Delta_{1,i}\Delta_{2,i}}{\sqrt{\sum_{i \in c_1}\Delta_{1,i}^2 \sum_{i \in c_1}\Delta_{1,i}^2}},$$

wherein $C_1$ is a common program historical data between the one of the users and one of the other users, $U_1$ is the one of the users, $U_2$ is one of the other users, $\Delta_{1,i}$ is a time $U_1$ stays with program i, $\Delta_{2,i}$ is a time $U_2$ stays with program i, and $S_2$ is the channel-interest similarity value, and wherein the common program historical data includes channels digested and times digested.

19. The non-transitory storage medium of claim 17, wherein the instructions to calculate the similarity index value comprise instructions to:
multiply the social similarity value with the channel-interest similarity value, and wherein a product of a multiplication is the similarity index value.

20. The non-transitory storage medium of claim 17, wherein the instructions to calculate the channel weight comprise instructions to:

calculate the channel weight based on an expression: $W = w * \Sigma_{i=1}^{N}(\text{Stay\_time}(U_i) * S_i)$, wherein w is the program regularity value, Stay_time is a time user $U_i$ stays on a channel, $S_i$ is the similarity index value between the one of the users and one of the other users $U_i$, and W is the channel weight.

* * * * *